United States Patent [19]

Stewart

[11] 3,840,740

[45] Oct. 8, 1974

[54] IMAGING DEVICE HAVING SOLID-STATE TARGET

[75] Inventor: Richard D. Stewart, Camillus, N.Y.

[73] Assignee: General Electric Company, Owensboro, Ky.

[22] Filed: Oct. 30, 1972

[21] Appl. No.: 301,985

[52] U.S. Cl. .......................... 250/211 J, 317/235 N

[51] Int. Cl. .......................................... H01j 39/12

[58] Field of Search. 340/173 LR, 173 LM, 173 LS, 340/173 LT; 250/220 M, 211 R, 211 J; 317/235 R, 235 G, 235 N

[56] References Cited

UNITED STATES PATENTS

| | | | |
|---|---|---|---|
| 3,488,508 | 1/1970 | Weimer | 250/211 J |
| 3,624,428 | 11/1971 | Weimer | 317/235 N |
| 3,660,667 | 5/1972 | Weimer | 250/211 J |
| 3,683,193 | 8/1972 | Weimer | 317/235 N |
| 3,700,961 | 10/1972 | Fletcher | 317/235 N |
| 3,721,839 | 3/1973 | Shannon | 250/211 J |
| 3,771,149 | 11/1973 | Collins | 317/235 N |

*Primary Examiner*—James W. Lawrence
*Assistant Examiner*—D. C. Nelms
*Attorney, Agent, or Firm*—N. J. Cornfeld; D. A. Dearing; F. L. Neuhauser

[57] ABSTRACT

A solid-state imaging system is provided wherein image charge on a solid-state target corresponding to a radiation image is separated from undesirable background charge resulting from dark current or high background radiation to enhance the contrast between the desired radiation image and the background.

9 Claims, 21 Drawing Figures

IMAGING DEVICE HAVING SOLID-STATE TARGET

BACKGROUND OF THE INVENTION

This invention relates to imaging devices and more particularly to solid-state targets for imaging devices.

Several solid state devices have been proposed to replace the conventional camera tube which uses an electron beam in conjunction with a photocathode or a photoconductive target.

In one such device, designated as a charge-coupled-device or CCD, charge, generated by radiation impinging upon a photosensitive semiconductor substrate is stored in a plurality of storage sites comprising an array of conductor-insulator-semiconductor capacitive cells forming depletion regions in the substrate in response to appropriate voltages applied between the respective conductors and the substrate. The amount of charge stored in each cell is read out by transferring the charge from site to site within each cell and from cell to cell in each row until the charge reaches a suitable sensing device such as a capacitively coupled differential amplifier which senses the charges as modulations of a steady signal.

In another solid state device, such as described and claimed in Michon U.S. Pat. No. 3,786,263 issued Jan. 15, 1974, and assigned to the assignee of this invention, the charge is similarly stored in one of two storage sites in the cell and then transferred to a second site from which it is removed or injected into the semiconductor substrate. This device, known as a charge-injection-device or CID, provides a modulated electrical signal corresponding to the radiation impinging upon the device by sensing the amount of change (of opposite sign) needed to neutralize the radiation generated charge injected into the substrate.

In both such approaches, however, the charge representing useful information can be obscured by the accumulation of undesirable charge representing dark current leakage as well as high background radiation. The former results in a certain amount of charge being stored in the absence of any radiation; the latter occurs when there is a lack of contrast between the background and the desired image, for example, a brilliantly lighted subject. Conveniently, both types of charge are referred to herein as background charge.

SUMMARY OF THE INVENTION

It is, therefore, an object of this invention to provide a system for discriminating between background charge and charge representing useful information.

It is another object of the invention to provide a sensing system wherein the undesirable background charge is processed independently of the charge representing useful information.

These and other objects of the invention will be apparent from the description and the drawings.

DESCRIPTION OF THE INVENTION

In accordance with the invention charge attributable to dark current, high intensity background and the like, hereinafter referred to as background charge, is separated from charge attributable to the desired signal.

Figure 1A:
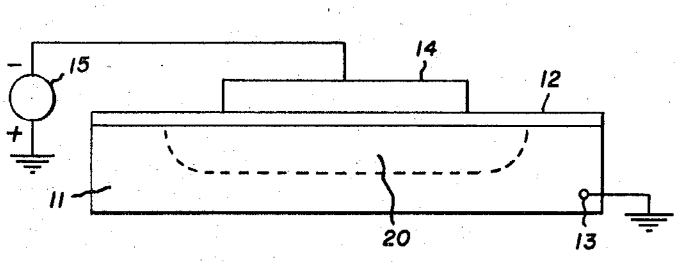
FIGS. 1A–1C are diagrams of a conductor-insulator-semiconductor cell connected in a circuit and illustrating various stages of operation of a charge storage device.
Figure 1B:
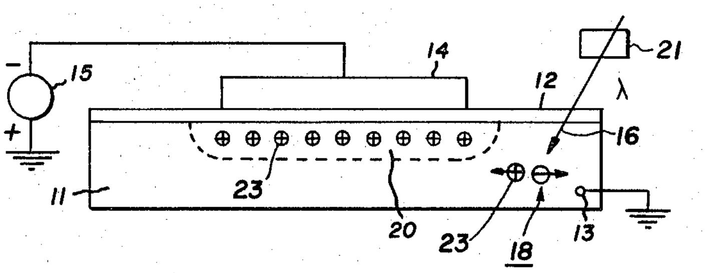
Figure 1C:
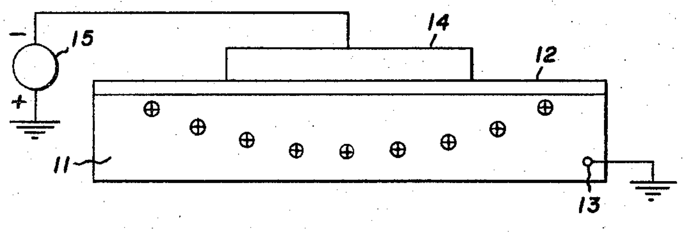

As described more fully in the aforementioned Michon patent, electrical charge corresponding to the intensity of a radiation source can be stored in an appropriately biased semiconductor substrate. For purposes of clarity, the mechanism of such charge storage is illustrated in FIGS. 1A, 1B, and 1C. A semiconductor substrate 11 such as, for example, N-doped silicon, has an oxide layer 12 thereon and a metal conductor plate 14 mounted on oxide layer 12. Substrate 11 is biased to form a depletion region 20 by the application of a negative potential from source 15 to plate 14.

Subsequent photon bombardment 16 transmitted through a semiconductor cell exposure means 21 (shown in block diagram), as shown in FIG. 1B, results in the creation of electron-hole pairs 18. The minority carrier charge, holes 23 in this instance as shown, are transported to and stored in depletion region 20 for a predetermined period of time. The amount of charge stored is then determined by removing or reducing the negative potential on plate 14 sufficiently to cause the stored charge to be injected into the substrate as seen in FIG. 1C. The magnitude of the stored charge can be measured, for example, by measuring the amount of negative charge injected from contact 13 to maintain charge neutrality in the substrate after the negative potential of 15 is reduced.

Figure 2:
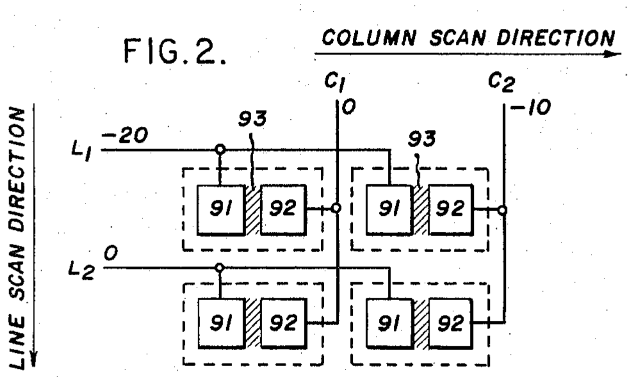
FIG. 2 is a simplified plan view of an array of charge storage cells using a particular readout.

Referring now to FIGS. 2 and 3A–3E, the operation of a simple four-cell array is shown wherein sequential storage and measurement or readout of charge is accomplished using two devices of the type shown in FIG. 1 coupled together to form each cell in the four cell array. The cells in the top line in FIG. 2 are shown appropriately biased to store charge under plate 91 of each cell which is shown biased to 20 volts.

The graphs of FIGS. 3A–3E depict the storage of charge in one of the cells in potential wells for illustrative purposes. FIG. 3A shows a cell (such as the upper right cell in FIG. 2) properly biased to store charge, but before commencement of bombardment. FIGS. 3B and 3C show cells which have been bombarded to saturation. In actual practice, of course, most cells will not, during the bombardment, saturate but will rather contain some increment of charge between the chargeless state of FIG. 3A and the saturated condition illustrated in FIGS. 3B and 3C.

It will be noted that the bias beneath plate 92 differs in FIGS. 3B and 3C. However, in both instances, the storability of charge beneath plate 91 is the same. The removal of negative bias from plates 92 in a given column only affects the cell in that column in the row or line being scanned, the lower left cell, for example, in FIG. 2.

To remove or readout the charge, the bias on plate 91 is raised to zero as shown in the lower line of cells in FIG. 2 and in FIGS. 3D and 3E. The charge under plate 91 in each cell in that line is then transferred, via a P-doped region 93 (or, as more fully described in the aforementioned Michon patent, by overlapping fields) coupling the zones under plates 91 and 92 together, to the zone under plate 92 of the same cell. A particular cell in the line is then read (the charge injected) by raising the bias on plate 92 in that column. Thus, as can be seen by referring to FIG. 2 all of the plates 92 in the left column have zero bias thereon. However, only the charge in the lower cell in that column is injected into the substrate since only the plates 91 in Line $L_2$ have zero bias thereon, signifying that the charge under plates 91 in that line had already been transferred to the region under plate 92 before the bias on plate 92 was raised. Graphically the bias on the upper and lower cells in the left column is illustrated respectively in FIGS. 3C and 3E.

In the foregoing description each cell in each line was sequentially addressed by first raising the bias on plate 91 to zero causing a shift of the charge to the portion of the substrate beneath plate 92 of the same cell. Subsequent raising of the bias on plate 92 of that cell to zero results in an injection of the stored charge into the substrate and this flow of charge is monitored and the resulting electrical pulse converted into video information.

However, as more fully described in the aforementioned Michon patent, the presence of surface states makes it more desirable in actual practice to operate the cells without reducing the bias to zero but rather to some arbitrary value, for example, −5 volts. To read out the cell then, plate 91 is reduced to −5 volts and subsequently the plate 92 is reduced to −5 volts.

While such an operational arrangement inhibits interference by surface states, the problem of undesirable background charge still exists. As stated previously, this is attributable to dark current and high background radiation or lack of contrast.

In accordance with the invention, this undesirable background charge is separated from the signal charge by providing a predetermined additional bias on plate 91 in each cell which is not removed during the first step of transfer of the signal charge to plate 92.

Figure 3:
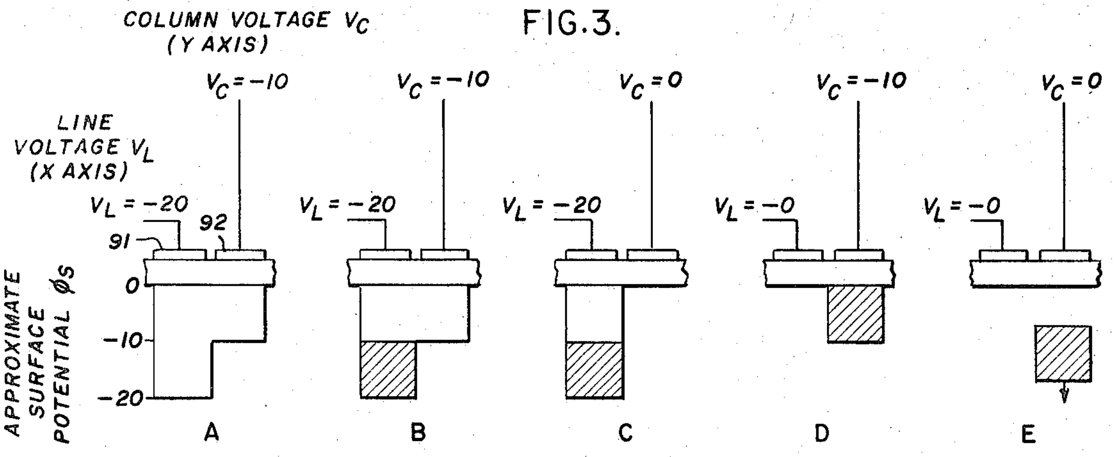
FIGS. 3A–3E are graphical illustrations of the charge potentials established in the substrate during the readout shown in FIG. 2.

Referring now to FIGS. 4A–4G the depletion regions beneath plate 91 and plate 92 are graphically illustrated as potential wells similar to that of FIG. 3. Again, as in FIG. 3, the potential wells having charge therein are shown in a saturated state for illustrative purposes only, it being understood that in actual practice, the accumulation of charge attributable to signal will vary from cell to cell, and in most instances, will be below saturation when the cell is scanned.

Figure 4:
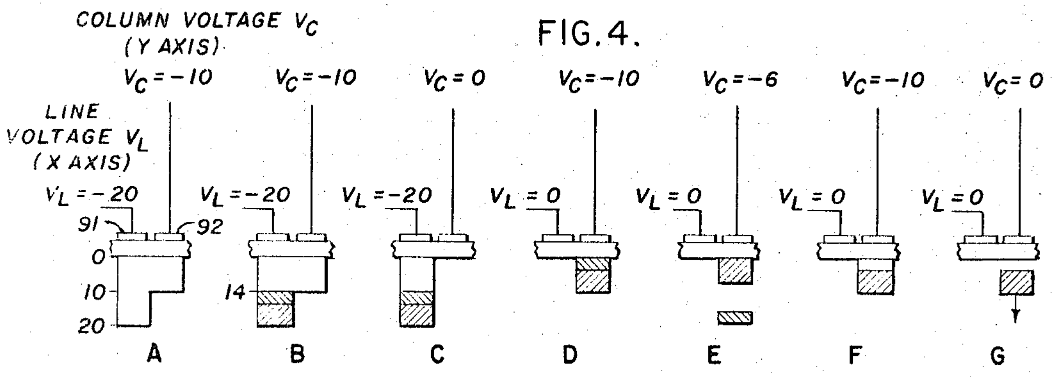
FIGS. 4A–4G are graphical illustrations of the charge potentials established in the substrate when background charge is separated from signal charge during readout in accordance with the invention.

FIGS. 4A and 4B show a cell respectively before storage and after an incremental time period. FIG. 4D shows a cell (before interrogation) in the line to be scanned wherein the bias on plate 91 has been raised to zero to transfer all charge to the region beneath plate 92.

FIG. 4C is illustrative of a cell in a line not being scanned, but in the same column as the cell being interrogated in the scanned line. The bias $V_C$ is denoted as O; however, the bias on plate 92 in the interrogated cell is changed several times during interrogations as will be described below with respect to FIGS. 4E–4G.

FIGS. 4E, 4F, and 4G illustrate the sequential biasings applied to a particular cell being scanned. For illustrative purposes, it is assumed that a background charge of −6 volts will be accumulated in each cell as will be explained in more detail below. The bias on plates 92 in the particular column is raised to −6 volts as shown in FIG. 4E. Any charge in excess of −6 volts (the background charge) cannot be retained by the potential well and thus is injected into the substrate. This charge, it will be recognized, corresponds to the signal charge previously described with respect to FIGS. 2 and 3.

The bias on plate 92 is then returned to −10 volts as shown in FIG. 4F. This provides a cancellation of the current flow attributable to discharge of the capacitor formed by plate 92 and substrate 11 as shown in FIG. 4E. The difference in the two current surges (discharge and charge) is the signal current as explained in more detail on pp. 52–56 and FIG. 12H of the aforementioned Michon U.S. Pat. No. 3,786,263.

Finally, as shown in FIG. 4G, the bias on plate 92 is raised to zero to inject the charge attributable to background into the substrate.

These sequential steps, it should be noted, are repeated for each cell in the line being scanned before interrogation of the following cell with the possible exception of the final step shown in FIG. 4G. This step—injection of the background charge into the substrate—may be performed sequentially in each cell or may be done simultaneously for all cells in the scanned line after interrogation of all cells in that line has been completed. In either instance, as will be explained below, the video signal detection means preferably are turned off during the injection of the background charge into the substrate to complete the separation of the background charge from the signal charge being transmitted to appropriate viewing means.

It will be noted that the bias on each cell illustrated in FIGS. 4A–4G was not increased from that shown in FIGS. 2 and 3A–3E. Thus, the overall charge storage capacity—in the illustrated embodiment—was not increased. To prevent saturation of the cells, the overall quanta of radiation may be reduced by appropriate optical means such as an iris diaphragm as is well known to those in the camera arts. Alternatively, depending on the type of semiconductor material used, the bias could be increased to increase the charge storage capacity of the cells. While the latter approach might improve the resolution, either embodiment will accomplish the main objective of the invention, i.e., to provide better contrast, by removing high background levels of radiation which approach or may even exceed the signal charge.

As stated earlier, the background level of −6 volts was selected for illustrative purposes only. The actual amount of charge attributable to background can be determined by measurements or empirically by viewing the video signal on a monitor and adjusting the bias voltages—as well as the overall light imput to the device—until the desired contrast is obtained.

The amount of bias selected for storage of the charge attributable to background is, of course, preferably equal to the background charge which will be stored during the incremental time period. In actual practice, it may be impossible to precisely match the bias to the quanta of background charge. Preferably, therefore, the bias is selected to be slightly less than the total anticipated background charge. While this may result in a slight amount of background charge transferred with the signal charge, this is preferred to retention of some of the signal charge with the background charge if the background bias, i.e. the background charge storage capacity, exceeded the actual background charge.

Figure 5:
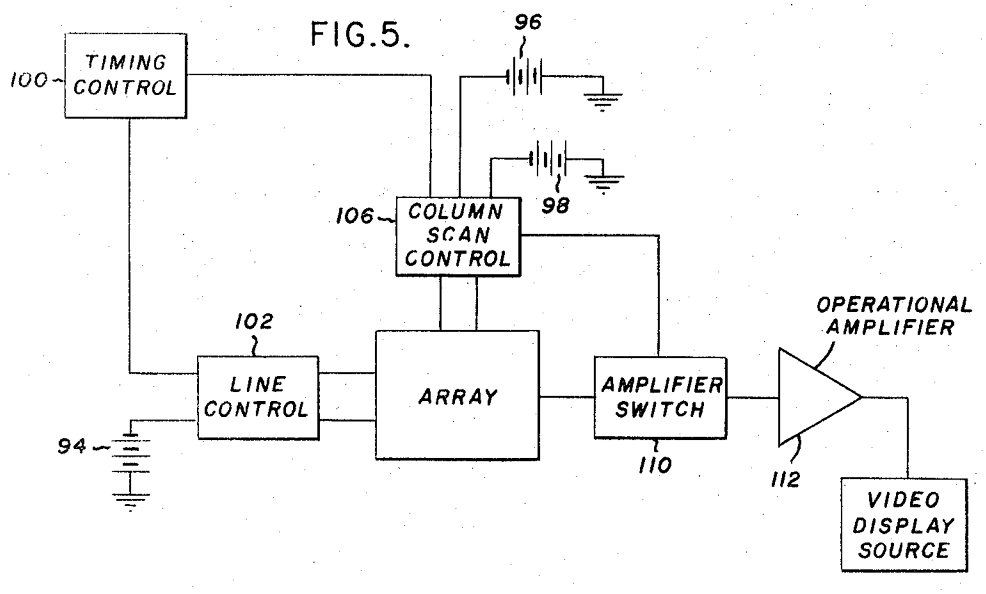
FIG. 5 is a simplified schematic of device including an array capable of separating background and signal charge.

Referring now to FIG. 5, a simplified schematic is shown of a scanning and sensing mechanism including an array capable of separating background and signal charge in accordance with the invention as illustrated in FIGS. 4A–4G. Master timing control 100 controls the line and column controls, shifting the line when at the end of the scan in the previous line. Line control 102 provides a bias of −20 volts from source 94 on all lines except the line being scanned. Column control 106 provides biases of −10 volts and −6 volts, and 0 volts bias respectively from sources 96 and 98 which are shifted along the line being scanned. In addition, Control 106 operated amplifier switch 110 to disconnect operational amplifier 112 from the array while the background charge is being injected into the substrate as in FIG. 4G.

Figures 6A, 6B, 6C, 6D:
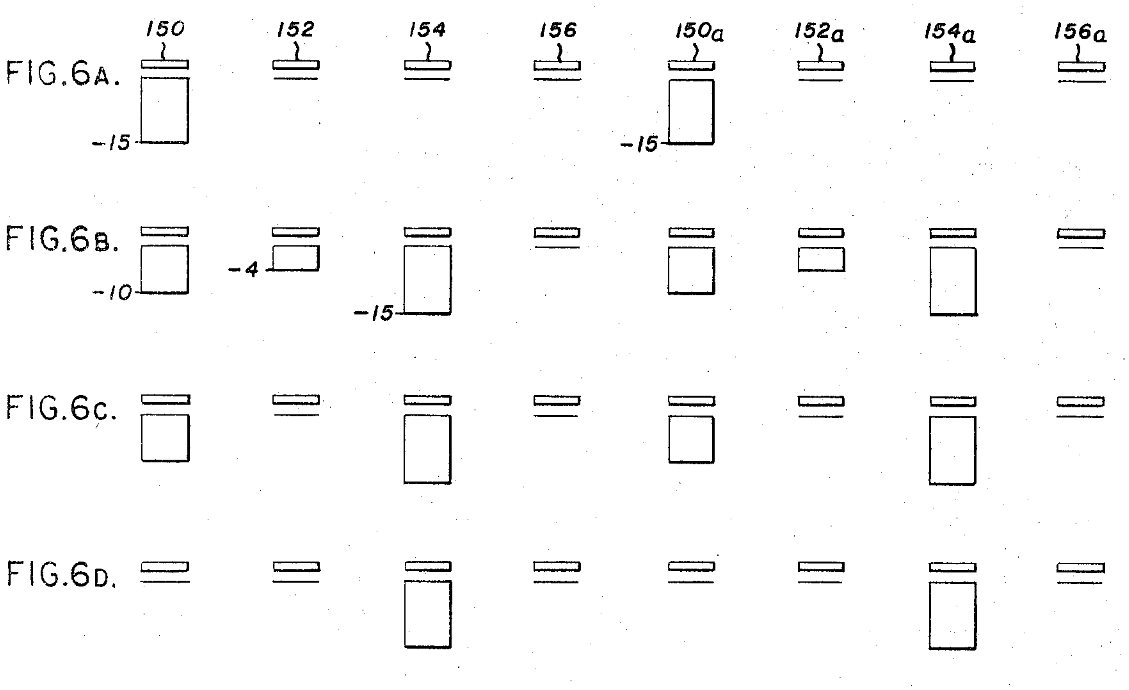
FIGS. 6A–6D are graphical illustrations of charge potentials in a substrate in another embodiment of the invention.

As previously mentioned, the separation of undesirable background charge from stored signal charge is desirable in a solid state array regardless of the type of scanning or signal detection used. Thus, in accordance with the invention, undesirable background charge may be separated from signal charge in a charge-coupled device as shown graphically in FIGS. 6A–6D by providing additional bias on plates 150 of each cell to provide capacity for storage of a predetermined amount of background charge, again, for example, of −6 volts. The signal charge is separated from the background charge in FIGS. 6B and 6C by lowering the bias on the plates 152 to −4 volts, and simultaneously lowering the bias on plates 154 to −15 volts and raising the bias on plates 150 to −10 volts. The stored signal charge under plates 150, that is, any stored charge in excess of the difference between the bias on plates 150 and the bias on plates 152, then transfers to the depletion regions beneath plates 154, leaving the background charge under plates 150. The signal charge stored in the region beneath plates 154 is then separated from the background charge by returning plates 152 to zero bias. The signal charge (beneath plates 154), it will be seen, is now completely isolated from the background charge (beneath plates 150) which may now be harmlessly injected into the substrate by raising the bias on plates 150 to zero. It will also be noted that plate 156 is used to provide isolation of the stored signal charge beneath plate 154 from the background charge stored beneath plate 150*a* in an adjacent cell as shown in FIG. 6C.

When the invention is used in the embodiment of FIG. 6, the shift-register techniques normally used to readout charge-coupled devices may be employed by appropriately modifying the timing controls to provide the background injection step. This, it will be seen, need only be done once for each line; the subsequent shift of the signal charge from cell to cell may then proceed for each row in accordance with prior art readout procedures known to those skilled in the art.

While the invention has been particularly described with respect to certain semiconductor materials and to two presently known solid state charge storage arrays, it should be readily apparent to those skilled in the art that the separation of background charge from signal charge in accordance with the invention may be made applicable to other types of charge storage and readout devices and to other semiconductor materials.

The invention, therefore, is to be limited only by the appended claims.

What I claim as new and desire to secure by Letters Patent of the United States is:

1. A solid state radiation sensitive device for the conversion of radiation into electrical charge in the presence of high background radiation comprising:

a. an array of radiation-sensitive cells formed in a substrate of semiconductor material, each of said cells comprising a plurality of contiguous charge storage regions in said substrate;

b. means for exposing said radiation-sensitive cells to radiation to generate charge comprising minority carriers in said cells, said minority carriers being stored in at least one of said charge storage regions;

c. means for reducing the capacity of said charge storage region having the minority carriers stored therein sufficiently to cause the minority carrier charge stored therein to flow into an adjacent charge storage region in said array;

d. means for reducing the capacity of said other charge storage region to a predetermined level sufficient to provide storage for minority carrier charge attributable to background radiation levels but insufficient to retain charge attributable to image radiation to thereby inject said image charge into said substrate.

e. means for sensing the resultant image charge injected into said substrate; and f. means for subsequently injecting said charge attributable to background radiation into said substrate.

2. The device of claim 1 wherein said means for subsequently injecting said charge attributable to background radiation include:

a. means for returning said other charge storage region to said first capacity;

b. and means for thereafter reducing the capacity of said other charge storage region to a level insufficient to retain charge attributable to said background radiation.

3. A solid state light sensitive device capable of converting a radiation image into a storable electrical charge pattern and separating electrical charges representing said image from electrical charge representing background radiation comprising:

a. means for biasing a first portion of a semiconductor substrate to form a depletion region capable of storing electrical charge therein in response to impingement of radiation thereon;

b. means for biasing a second portion of said substrate adjacent said first portion;

c. means for coupling said first and second portions together to permit transfer of electrical charges from one of said portions to the other;

d. means for charging the bias on said portions to permit a predetermined proportion of said charge to transfer from one of said portions to the other;

e. means for removing the charge stored in one of said portions while retaining the stored charge in said other portion to thereby separate charge attributable to said image from charge attributable to background radiation;

f. and means for removing said stored charge from said other portion subsequent to removal of charge from said first portion.

4. The device of claim 3 wherein said biasing means include conductive elements on said substrate to provide a depletion region in said substrate adjacent the conductive element.

5. The device of claim 3 wherein said predetermined proportion of charge transferred from one portion to a second provides a separation of the stored charge into a first quanta representing signal charge and a second quanta which represents background charge.

6. The device of claim 3 wherein the amount of change of the bias on said portions to separate said signal charge from said background charge is predetermined to provide a charge storage capacity in one of said portions which is not greater than the average background charge, thereby to prevent retention of some of the signal charge with the background charge in said one portion.

7. An imaging system comprising a solid state target means for converting radiation from an image into a corresponding signal charge on said target means, said target including a first region for storing charge therein comprised of said signal charge and a background charge, signal charge detection means coupled to said target means, and control means coupled to said target means for discharging a first quantity of charge substantially corresponding to said signal charge into said detection means and for diverting a second quantity of charge corresponding substantially to said background charge from said detection means.

8. The device of claim 7 wherein said target means is a charge-injection device and further includes a second region for storing charge and means for charge transfer linking said first and second regions, said control means further being sequentially operable to 1. discharge charge including said first and second quantities from said first region to said second region;
2. discharge said first quantity into said detection means from said second region;
3. uncouple said target means and detection means; and
4. discharge said second quantity from said second region to thereby divert the background charge from said detection means.

9. The device of claim 7 wherein said target means is a charge-coupled device and further includes a second region for storing charge and means for charge coupling said first region to said second region, said control means being further operable to discharge one of said first and second quantities from said first region to said second region, and thereafter to electrically isolate said one quantity on said second region from the other of said first and second quantities remaining on said first region.

* * * * *